United States Patent [19]

Grenzow

[11] 4,126,768

[45] Nov. 21, 1978

[54] PORTABLE AUTOMATIC NUMBER OUTPULSER

[75] Inventor: Rolland L. Grenzow, Glen Ellyn, Ill.

[73] Assignee: Bell Telephone Laboratories, Incorporated, Murray Hill, N.J.

[21] Appl. No.: 810,152

[22] Filed: Jun. 27, 1977

[51] Int. Cl.² ............................................. H04M 1/42
[52] U.S. Cl. ................................ 179/90 B; 179/2 DP; 340/149 R
[58] Field of Search .............. 179/90 R, 90 B, 90 BD, 179/90 BB, 90 AN, 90 G, 90 DP, 2 C, 1 C; 340/149 R, 149 A; 235/61.7; 340/164 R

[56] References Cited

U.S. PATENT DOCUMENTS

| 3,806,874 | 4/1974 | Ehrat | 340/149 R |
|---|---|---|---|
| 3,823,308 | 7/1974 | Goldberg | 235/61.7 |
| 3,859,634 | 1/1975 | Perron et al. | 340/149 R |
| 3,872,435 | 3/1975 | Cestaro | 340/149 R |
| 3,934,122 | 1/1976 | Riccitelli | 235/61.7 |
| 3,976,840 | 8/1976 | Cleveland et al. | 179/2 DP |
| 4,011,414 | 3/1977 | Warren | 179/90 R |

OTHER PUBLICATIONS

"Pocket Data Terminal," Radio–Electronics, Jan., Feb. 1976, Charles Edwards.
"Wallet Terminal Keyboard With Acoustic Coupler,"
IBM Technical Disclosure Bulletin, vol. 10, No. 3, Aug. 1967.

Primary Examiner—Kathleen H. Claffy
Assistant Examiner—Gerald L. Brigance
Attorney, Agent, or Firm—Charles H. Davis; Jerry W. Herndon

[57] ABSTRACT

An automatic, portable digit outpulser for use with a telephone is disclosed. In one preferred embodiment, the outpulser resembles a credit card encasing electronic circuitry and having a low-profile acoustic device mounted on one surface of the card for acoustically coupling the outpulser to the transmitter of a telephone. Optical and mechanical coupling arrangements are also disclosed. The electronic circuitry includes a memory for storing representations of telephone digits to be outpulsed and multifrequency signal generating circuitry for generating audio frequency signals, similar to those generated by a standard telephone equipped with a multifrequency key set, in accordance with the stored digit representations. The memory also contains control data words which are individually alternated in sequence with digit words. The signal generating circuitry is directly responsive to the digit and control words for generating both digit signals and interdigital timing periods.

16 Claims, 8 Drawing Figures

PORTABLE AUTOMATIC NUMBER OUTPULSER

BACKGROUND OF THE INVENTION

This invention relates to telephone systems in general and, in particular, to automatic repertory dialers, telephone number outpulsers and credit cards equipped with active electronic circuitry.

The standard telephone equipped with a multifrequency (MF) key set is today being used for purposes far beyond that originally intended of allowing a calling telephone subscriber to key-in digits of a called telephone number. For example, in U.S. Pat. No. 3,976,840, a special purpose calculator is acoustically coupled to the handset of a MF telephone and, by means of signals activated by keys on the device and by an internal stored program, is used to transact stock purchases, sales and the like with a distant computer.

As another example, the telephone industry proposes to use MF telephones in conjunction with telephone office innovations to automate many routine call handling operations that are currently performed by operators. Such arrangements are described in U.S. Pat. Nos. 4,054,756, which issued Oct. 18, 1977 to Comella et al and 4,031,324, which issued on June 21, 1977 to Dudonis. These patents disclose improvements to a basic Traffic Service Position System (TSPS) telephone office, described in detail in U.S. Pat. No. 3,484,560 to Jaeger, Jr., et al., to service automatically special calls such as coin, collect, person-to-person and credit calls. The subscriber making such a call is verbally instructed over the telephone by a computer at the TSPS office to enter digits, by means of the MF key set, describing the special type of call being placed and providing data required by the office for completing and billing the call. A subscriber placing a credit card call, for example, would be instructed by the computer at the appropriate time to transmit his credit card number to the computer by using the key set to key-in the digits of the number. The entire keying sequence for such a call would include two digits to identify the type of special call, a plurality of credit card number digits and 7 or 10 digits to identify the called subscriber. Such a lengthy and complicated keying sequence is highly subject to human error. A need therefore exists to simplify the operations to be performed by the subscriber, especially when the subscriber is away from his residence or office.

Automatic electronic outpulsing devices used to simplify keying sequences in certain cases are known in the art. For example, U.S. Pat. No. 4,011,417, which issued to W. D. Warren on Mar. 8, 1977, discloses a desk telephone set equipped with keys and an internal microprocessor and memory for storing and outpulsing subscriber telephone numbers. The set, however, is not designed for carrying on the person, nor is the outpulsing circuitry adapted for ease in coupling to the telephone while in the field. The stock transaction calculator, described in U.S. Pat. No. 3,976,840, is easily coupled to a telephone handset by acoustic means, but it appears to be portable for field use only in the sense of being convenient to carry in a shoulder case or in an attache case, much like a camera.

Portable credit and identification cards having outputting electronic circuitry are also known. See, for example, U.S. Pat. Nos. 3,934,122, 3,859,634 and 3,934,122. These devices, however, are adapted for use only with special terminals and not for convenient field use with a telephone. Moreover, such devices use multiple circuits for generating output information and control functions. It is desirable to simplify this circuitry for use in small portable outputting devices.

A need therefore exists for a simplified device designed to be conveniently carried by a telephone subscriber for aiding the keying process of placing certain calls.

SUMMARY OF THE INVENTION

This invention fills the foregoing need by providing a simplified, portable digit outpulser, physically arranged to be carried in a pocket, purse or wallet and easily coupled to a telephone.

In one preferred embodiment of the invention, electronic circuitry of a telephone digit outpulser is encased within a credit or identification card-like structure. A low-profile acoustic device is mounted within the card and is arranged to couple the card with the transmitter of a telephone. The electronic circuitry includes means for storing representations of digits to be outpulsed, such as a telephone subscriber credit card number and other frequently dialed numbers. The storing means includes a plurality of first storage words containing the stored digit representations, with ones of the first storage words being arranged in a prescribed sequence with ones of a plurality of second storage words containing information for controlling the generation of interdigital timing periods. A signal generating circuit converts the stored digit representations to single and MF output signals which are transmitted to the acoustic device.

In other embodiments, optical and mechanical arrangements are provided for coupling signals from the outpulser to a telephone.

The invention substantially simplifies the structure required to generate digit signals and interdigital periods. The storing means contains a plurality of individually addressable storage words which contain in alternate words the stored digit representations and interdigital period control information. The storage words are read sequentially at prescribed intervals. Each output digit signal is generated and transmitted to the coupling device for the duration of one of the intervals in response to a storage word containing the digit representations. An interdigital period is generated for the duration of an interval in response to the reading of a word containing the interdigital control information.

A feature of the invention in a low-profile acoustic device mounted is the card structure.

Another feature is the provision of POWER and START microswitches mounted on the outpulser.

Another feature is the arrangement of the signal generating circuitry and the stored information such that non-digit single frequency alerting tones are audibly generated both when power is activated to the electronic circuitry and at the end of an outpulsing sequence to alert the subscriber to remove the power.

A further feature is the provision of a plurality of other microswitches mounted on the card to allow the selection of a number to be outpulsed from a plurality of numbers.

Still a further feature is the provision, in an embodiment using optical coupling of the outpulser to the telephone, of proximity switches to activate the power to the outpulser automatically when it is placed in proper coupling alignment with respect to the telephone.

BRIEF DESCRIPTION OF THE DRAWING

The foregoing and other features of the invention will be more apparent upon a reading of the following detailed description taken in conjunction with the drawing in which.

BACKGROUND DESCRIPTION OF THE TSPS OFFICE ARRANGED WITH AUTOMATED SPECIAL CALL FEATURES

Figure 1:
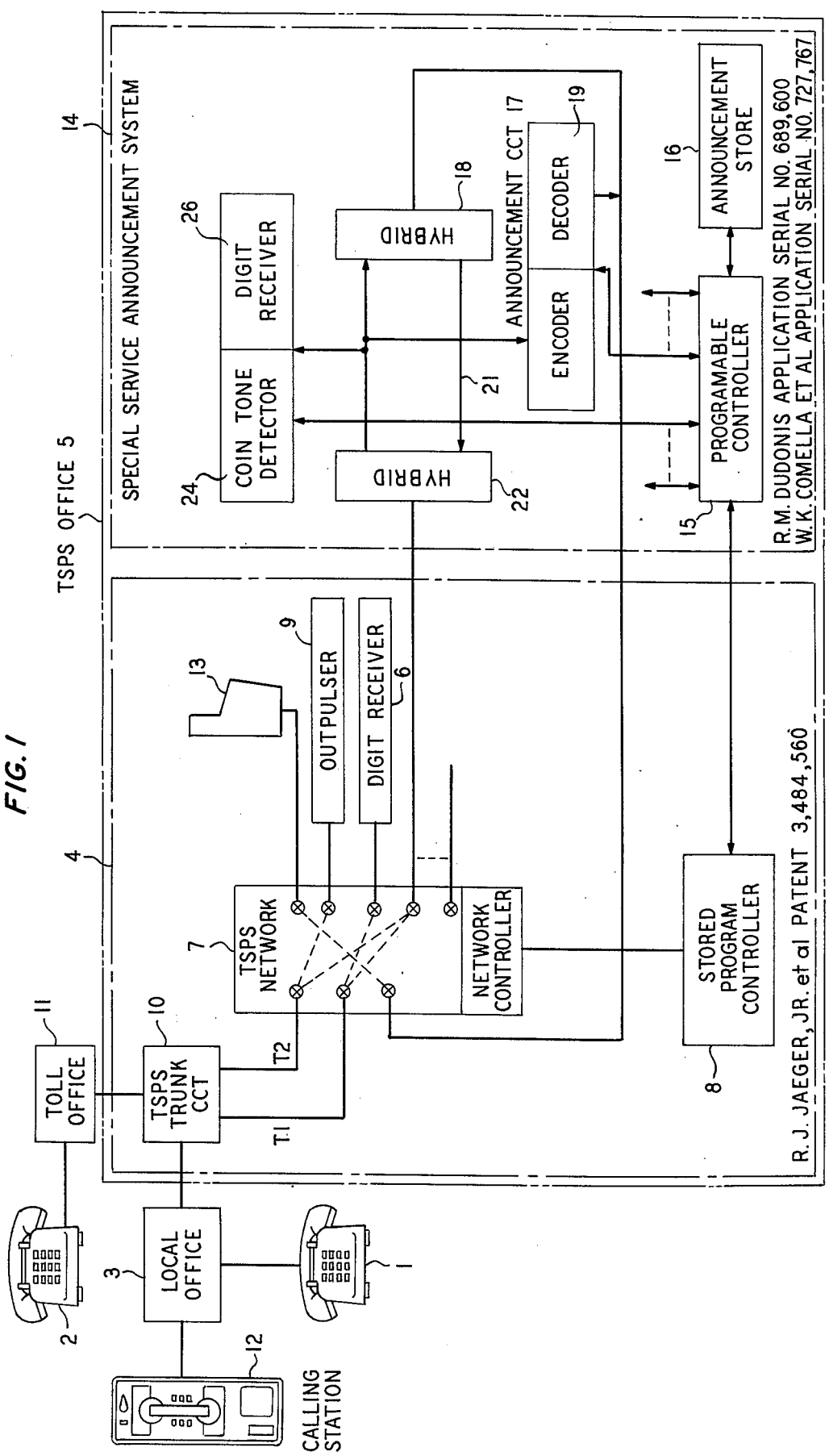
FIG. 1 illustrates a Traffic Service Position System (TSPS) telephone office, as disclosed in the Jaeger U.S. Pat. No. 3,484,560, further equipped with special circuitry for automating coin and special service calls, as shown in the Comella et al and Dudonis disclosures and illustratively with which the outpulser of this disclosure communicates.

FIG. 1 illustrates, as mentioned, a TSPS telephone office which was developed to automate many of the functions previously performed by operators at switchboards.

The basic TSPS office 4, described in the Jaeger, Jr. patent, automated many functions of different call types, but did not include all functions required to complete the handling of coin and special service calls such as credit and person-to-person calls. Such calls were extended to an operator at a position console, such as 13, for completion. An improvement involving a portion of the special service announcement system 14 was later incorporated into the basic TSPS office, as described by the Dudonis disclosure to automate the handling of coin calls without the intervention of an operator. Another improvement disclosed by Comella et al involving the special service announcement system 14 automates the handling of other calls such as credit calls, person-to-person calls and the like. The improved TSPS system automatically makes verbal announcements generated by the special service announcement system 14 to a subscriber placing a coin or special service call. The announcements are tailored to the specific type of call being placed. For example, for a coin call, a statement of the amount of money to be deposited for an initial call period is made and for a person-to-person call, interrogatories are made requesting the calling subscriber to state the name of the person to whom he wishes to speak.

As one brief example of the operation of the improved TSPS office, consider that a subscriber at coin station 12 wishes to make a person-to-person credit call to a subscriber at station 2.

The subscriber is initially instructed as to how to place the call by means of an instruction contained in a telephone directory or placed on the face of the coin telephone. An example of what might be stated in such an instruction is as follows: "In order to place a special service toll call, proceed as follows: Lift the receiver; deposit 10 cents (only at coin stations); listen for dial tone and then dial 0 plus the called number. Upon receipt of a second tone after dialing, indicate the type of call you are placing by keying-in the appropriate digits:

11 for collect
12 for person-to-person
13 for charge to third number
14 for credit card, station-to-station
15 for credit card, person-to-person
16 for time and charges."

The calling subscriber initiates the call in accordance with the instruction by dialing to local office 3 a prefix digit 0 followed by 7 or 10 digits identifying station 2. The "0" value of the prefix digit indicates that special handling is required to complete the call. In response to the prefix digit 0, the local office 3 seizes an outgoing coin trunk which terminates in a trunk circuit, such as 10, of TSPS office 5. Local office 3 then sequentially sends the called party digits to the TSPS office where they are received by digit receiver 6 via split trunk connection T1 and connections established through the TSPS network 7 by the stored program controller 8. The stored program controller 8 retrieves the digits from receiver 6 as they arrive and upon completion of reception it establishes a connection between the subscriber and special service announcement circuit 14 by means of the T1 connection, network 7 and hybrid 22.

In this example, programmable controller 15 is commanded by stored program controller 8 to return a second dial tone to station 1. Upon hearing the dial tone, the subscriber keys-in the digits "15" indicating that a person-to-person credit card call is being placed.

Digit receiver 26 in the special service announcement system 14 detects the digits identifying the type of call and gives them to programmable controller 15 which proceeds to generate appropriate verbal instructions to the calling subscriber in accordance with the call type. For this call, the announcement system 14 responds with an instruction such as "At the tone, state the name of the person with whom you wish to speak." Decoder circuit 19 then generates the tone and the calling subscriber responds with a name such as "Nadine Pearson." Announcement system 14 stores this name in digital format and then generates another instruction such as "At the tone, key in your credit card number." Decoder 19 generates this tone and, in response, the subscriber keys in the digits of his credit card number. The digits are received by digit receiver 26. Controller 15 obtains the credit card digits from receiver 26 and transmits them to stored program controller 8 for billing of the call, and the call is completed as explained in full detail in the Jaeger, Jr., Dudonis and Comella et al disclosures.

DETAILED DESCRIPTION OF A PREFERRED EMBODIMENT OF THIS INVENTION

Figure 2:
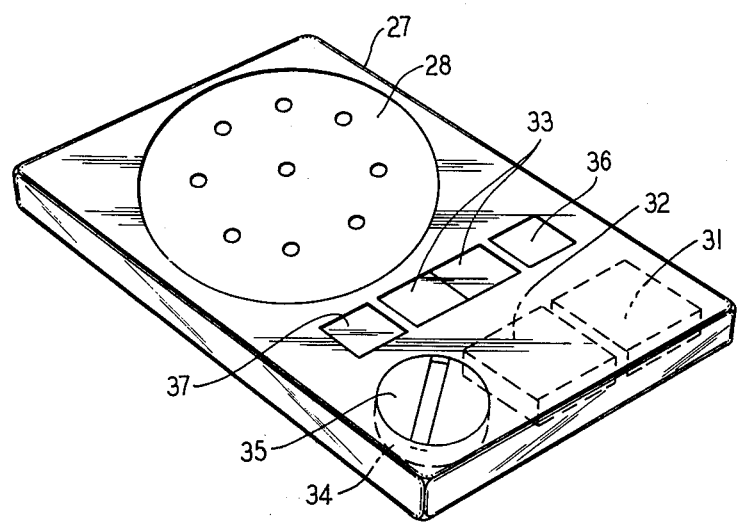
FIG. 2 illustrates a preferred physical embodiment of the outpulser resembling a credit or identification card to be carried on the person.

For use with the improved TSPS system and other conventional telephone systems, a preferred physical embodiment of an electronic outpulser is shown in FIG. 2 in the form of a card-like device 27 designed to be carried on the person. On one surface of the card, a low-profile acoustic transducer 28 is mounted substantially flush with the card surface so that the transducer may be held in acoustic alignment with the transmitter of a telephone. Encased in the body of device 27 are, illustratively, two integrated logic circuit chips, one chip 31 containing digital logic including a programmable read-only memory (PROM) in which is stored representations of digits to be outpulsed and associated memory addressing circuitry. The other chip 32 includes analog circuitry used for converting the digital representations stored in the PROM into appropriate audible frequency signals for transmission to the acoustic transducer. Optionally, a plurality of microswitches 33 are mounted approximately flush with respect to the surface of the card and allow the user to select one of several numbers to be outpulsed such as a credit card number and frequently dialed telephone numbers. A battery 34 is also mounted inside device 27 to power the integrated logic chips and is arranged to be accessible for replacement by unscrewing a cover plate 35 which forms part of the surface of device 27. A sheet-type battery, such as the type used to provide power for automatic cameras, could also be advantageously used for this purpose. A microswitch 36 activates the power to the logic chips. A microswitch 37 activates the outpulsing of a number selected by one of the microswitches 33.

Figure 3:
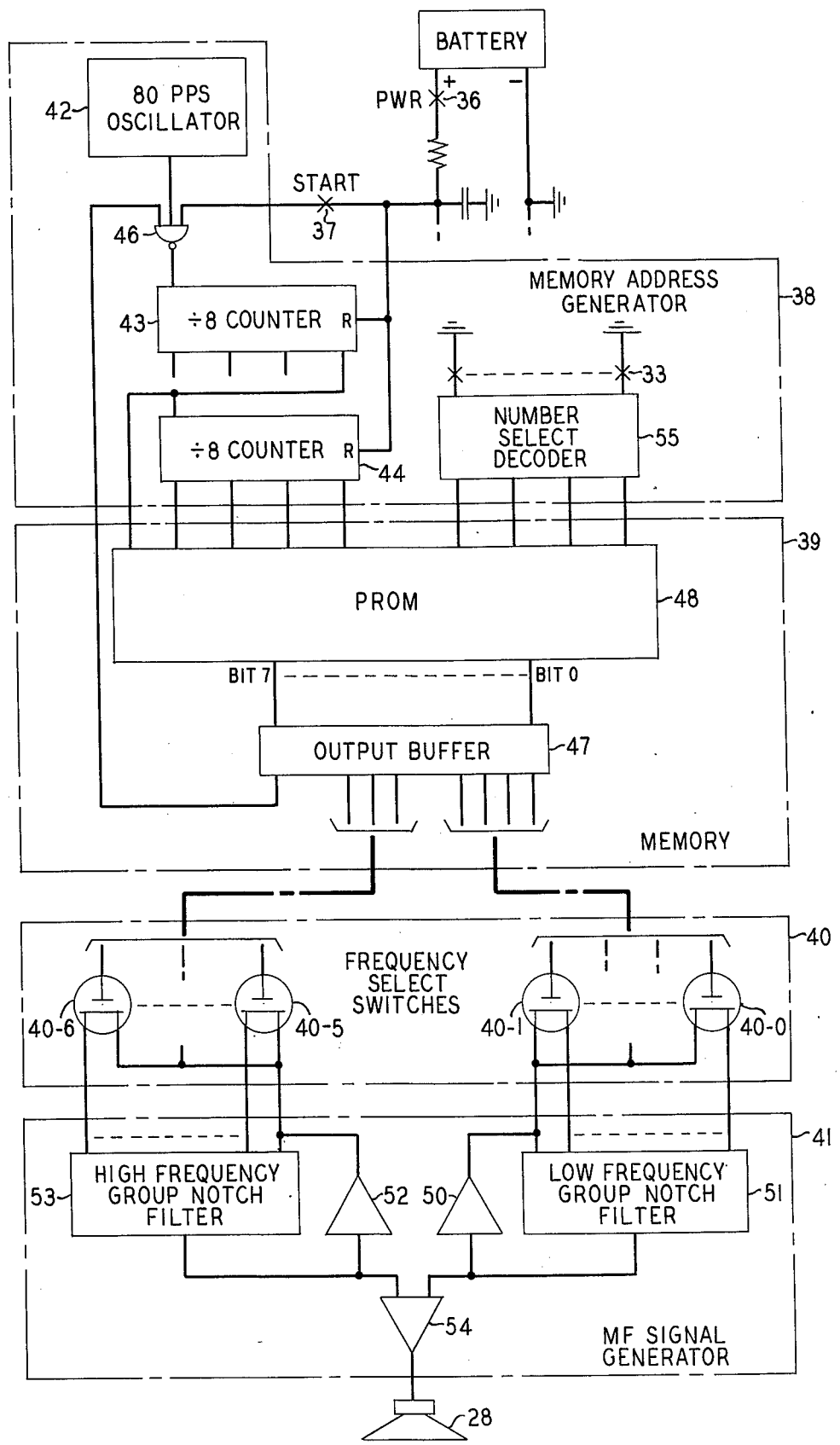
FIG. 3 illustrates one preferred circuit embodiment of the outpulser.

An illustrative, preferred embodiment of the circuitry of device 27 is set forth in FIG. 3. A memory address generator 38 and memory 39 illustratively form the circuitry of integrated circuit chip 31 in FIG. 2. Frequency select switches 40 and MF signal generator 41 illustratively form the circuitry of integrated chip 32.

MF signal generator 41 comprises a low frequency group oscillator consisting of amplifier 50 and feedback notch filter 51, and a high frequency group oscillator consisting of amplifier 52 and feedback notch filter 53. The low and high group oscillators operate in conjunction with the stored digit representations in PROM 48 to generate the same MF signals that are produced by conventional telephones manufactured by Western Electric, Incorporated and equipped with TOUCH-TONE ® calling. Selectable frequencies of the low frequency group used in TOUCH-TONE calling are 697, 770, 852 and 941 hertz and those of the high frequency group are 1209, 1336 and 1477 hertz.

Figure 4:
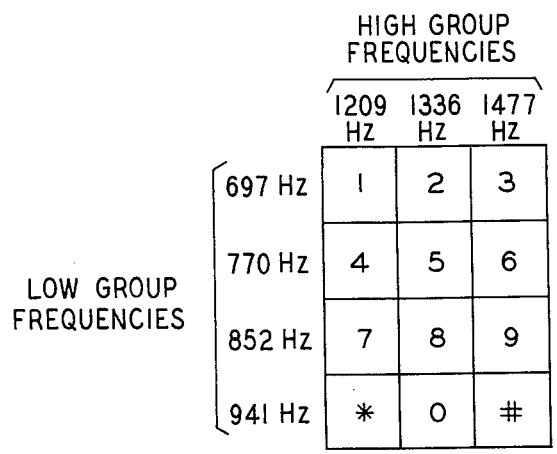
FIG. 4 is a truth table arranged in the physical layout of digit keys on a conventional MF telephone and showing the conventional assignment of frequencies in a high group and a low group of frequencies corresponding to the individual digit keys of the telephone.

FIG. 4 shows a truth table organized in accordance with the arrangement of digit keys on such a telephone and the assignment of the low and high group frequencies to each of the keys. The high group frequencies are assigned to the columns of the truth table, as shown, and the low group frequencies are assigned to the rows. Thus, a depression of the digit key 5, for example, would result in a signal having a 770 hertz component and a 1336 hertz component.

With reference now to FIG. 3, to generate the proper output signals recognizable by a telephone office as a digit, one of the selectable frequencies from both the low and high frequency groups is combined by amplifier 54 to produce a MF signal to transducer 28.

In accordance with one feature of this invention, selection of the frequencies of the low and high group oscillators is accomplished by the field effect transistor (FET) switches 40-0 to 40-6 which are individually controlled by bits of the words stored in PROM 48.

In accordance with another feature of the invention, the words of PROM 48 and the binary states of the bits thereof are arranged to control the generation of both the proper MF signals and the required interdigital timing periods, as will be seen.

Figure 5:
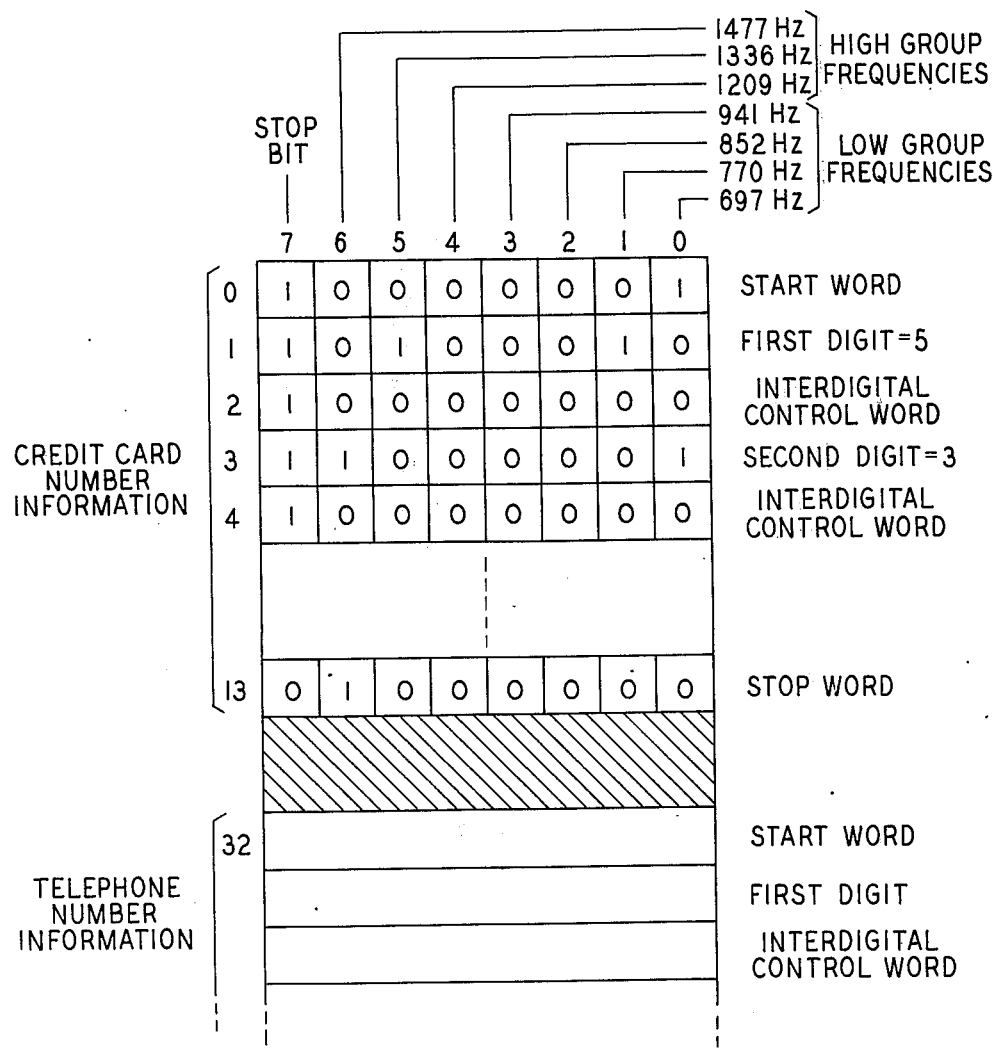
FIG. 5 discloses the memory organization and an illustrative portion of the stored contents of a programable read-only memory contained in the outpulser for controlling the outpulsing of a subscriber credit card number and other telephone numbers.

One illustrative arrangement of the contents of PROM 48 is shown in FIG. 5. By way of example only, PROM 48 is divided into 32 word memory blocks of which each contain separate digit sequences to be outputted. The individual blocks are selected by the number select decoder 55 in FIG. 3, which supplies signals to PROM 48 defining the memory block selected in accordance with which one of the number select microswitches 33 is operated. The 32-word block size is convenient for the circuitry of the outpulser since it is an integer power of the binary base 2. Illustratively, the first block, in words numbered 0 to 13, contains a credit card number digit sequence. A second block beginning with the word numbered 32 illustratively contains the information for controlling the outpulsing of a frequently called telephone number.

As shown in FIG. 5, each one of the bits 0 to 3 of each word of PROM 48 is associated with a different one of the low group frequencies, and each one of bits 4 to 6 are associated with a different one of the high group frequencies. A "1" binary state in any of these bits causes, as will be seen, the generation of its associated frequency by MF signal generator 41 and a "0" binary state prevents the generation of that frequency.

Bit 7 of each word of PROM 48 is a control bit used, as will be seen, for controlling the termination of outpulsing when a complete digit sequence has been outpulsed.

The memory address generator 38 comprises a 80 pulse-per-second (PPS) digital oscillator 42 and counters 43 and 44 to generate address signals at prescribed intervals for sequentially reading storage words of PROM 48.

In accordance with the invention, the prescribed rate of reading the words of prom 48, together with the output signals generated in accordance with the stored information in the words, produces both the proper digit signals and the proper interdigital timing periods. Specifically, PROM 48 is sequentially addressed at 100 millisecond intervals. In response to "1" states in bits 0 to 6 of the word being addressed, MF signal generator 41 generates the appropriate tone signals and transmits them to transducer 28 for the 100 millisecond interval. In response to all "0" states in bits 0 to 6 of a word being addressed, MF signal generator 4 generates no output signal during the 100 millisecond interval and this serves as an interdigital timing period.

To generate the 100 millisecond addressing rate of PROM 48, counter 43 counts pulses from the oscillator 42. The most significant stage of counter 43 is used as the least significant bit of the address to PROM 48. Counter 44 is also incremented by pulses from the most significant stage of counter 43, with the four stages of counter 44 being used to form the next 4 bits of the PROM 48 address.

As one illustrative example of the operation of this outpulser, consider that a user having the credit card number 537126 wishes to place an automated station-tostation credit card call. A portion of the stored contents of PROM 48 for this credit card number are shown in FIG. 5.

Before initiating the call, the subscriber depresses the POWER microswitch 36. He then depresses one of the number select microswitches 33 corresponding to the credit card number. Operation of the POWER microswitch applies battery power to the outpulser circuitry in FIG. 3 and, additionally, resets the stages of counters 43 and 44 to "0." The number select decoder 55 applies predefined address signals, which are all "0" in this case, to PROM 48, in accordance with the operation of the credit card select microswitch.

PROM 48 thus receives the address "0" from counters 43, 44 and from number select decoder 55. In response, it applies the stored contents of word 0 to output buffer 47. The STOP bit 7 of this word is "1," as shown in FIG. 5, which partially enables NAND gate 46 at its leftmost input. Since the START microswitch 37 is not yet enabled, the pulses from oscillator 42 are not yet applied to counter 43.

The contents of bits 0 to 6 of PROM START word 0 are applied by output buffer 47 to respective ones of the frequency select switches 40. Since only bit 0 in word 0 is set to the value "1," only switch 40-0 is activated. This controls the low frequency group oscillator to generate the single frequency alerting signal of 697 hertz. The high frequency group oscillator is not activated. The subscriber is able to hear the 697 hertz signal transmitted from transducer 28 and is thus alerted that the outpulser is functioning and prepared for operation.

In accordance with the instructions mentioned earlier for placing a credit card call, the subscriber now lifts the telephone handset and waits for dial tone. When dial tone is received, he keys the number 0 to indicate that special service is required, followed immediately by 7 or 10 digits specifying the station to which he wishes to be connected. These digits are transmitted to a TSPS office, for example, as shown in FIG. 1. Also in accordance with the instructions, he then waits to receive a second dial tone at which time he keys in the number sequence 14 indicating to the special service announcement system 14 in FIG. 1 that this call is a station-to-station credit card call. The special service announcement system 14 responds with the verbal instruction "At the tone, key in your credit card number." When this tone is received, the subscriber holds the acoustic transducer 28 over the transmitter of the telephone handset. The telephone office does not respond to the 697 hertz signal then coupled from transducer 28 into the handset because the signal does not represent one of the valid multifrequency digit signals shown in FIG. 4. The subscriber now depresses the START microswitch 37. The operation of the START microswitch completely enables NAND gate 46 to apply the pulses from oscillator 42 to counter 43. After 100 milliseconds, the address signals to PROM 48 from counters 43 and 44 are incremented to the value 1, which causes PROM 48 to address its word number 1 in FIG. 5. The "1" state of bit 7 of this word continues to enable NAND gate 46 so that counters 43 and 44 continue to count pulses from oscillator 42. The states of bits 0-3 of word number 1 control the low frequency group oscillator to generate a signal of 770 hertz in accordance with the "1" state of bit 1. The states of bits 4-6 likewise control the high frequency group oscillator to generate a signal of 1336 hertz in accordance with the 1 state of bit 5. The combined MF output signal representing the first credit card number digit 5 is applied by amplifier 54 to transducer 28 for 100 milliseconds. At the expiration of the 100 milliseconds, the address signals to PROM 48 are incremented to the value 2 and word 2 is read from PROM 48. As seen in FIG. 5, this word contains all zeroes with the exception of the control bit 7 which maintains the enabling of NAND gate 46. None of the frequency select switches 40 are operated as a result of the "0's" in bits 0-6. As a result, no output signal is generated by MF signal generator 41 and this silent interval, which lasts for 100 milliseconds, creates the required interdigital timing period between the outpulsing of the first digit and that of the second digit to follow.

In a like fashion the remaining digits of the credit card number are outpulsed at appropriate intervals as the address signals to PROM 48 sequentially advance at 100 millisecond intervals. When the STOP word 13 is encountered, the "0" state of bit 7 of that word causes the disabling of NAND gate 46 to stop the counting of counters 43 and 44. The single "1" in bit 6 of word 13 operates frequency select switch 40-6, which causes the high frequency group oscillator to generate an alerting signal of 1477 hertz. This single frequency signal is an invalid digit signal that is ignored by the TSPS office. The 1477 hertz signal alerts the subscriber of the completion of the outpulsing sequence and, in response, he removes the card from the telephone handset and deactivates the power thereto by releasing the POWER microswitch 36. The call is then completed automatically by the TSPS office as described in detail in the aforementioned Jaeger et al, Dudonis and Comella et al applications.

Figure 6:
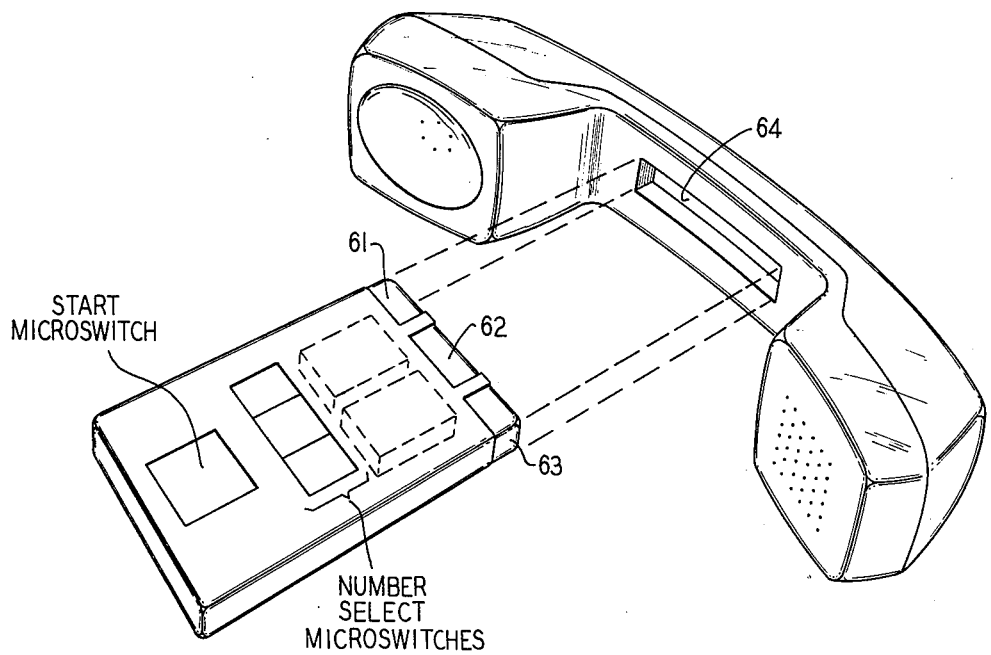
FIG. 6 illustrates an alternative mechanical contact arrangement on the outpulser for coupling to mating contacts in a recess of a telephone handset.

FIG. 6 shows an alternative physical embodiment of the outpulser in which coupling to the telephone is provided by metallic contacts 61, 62, and 63 mounted on one edge of the card. The telephone handset is provided with a recess 64 having receiving contacts (not shown), which may be retractable when the card is not inserted therein for reducing the possibility of vandalism. Power for operating the electronic circuitry of the card is obtained from battery and ground supplied by the telephone office by means of the power contact 63 and the ground contact 62. The ground contact 62 is also common to the outputting terminal 61 on which is supplied the MF output signals for transmission to the telephone office.

Figure 8:
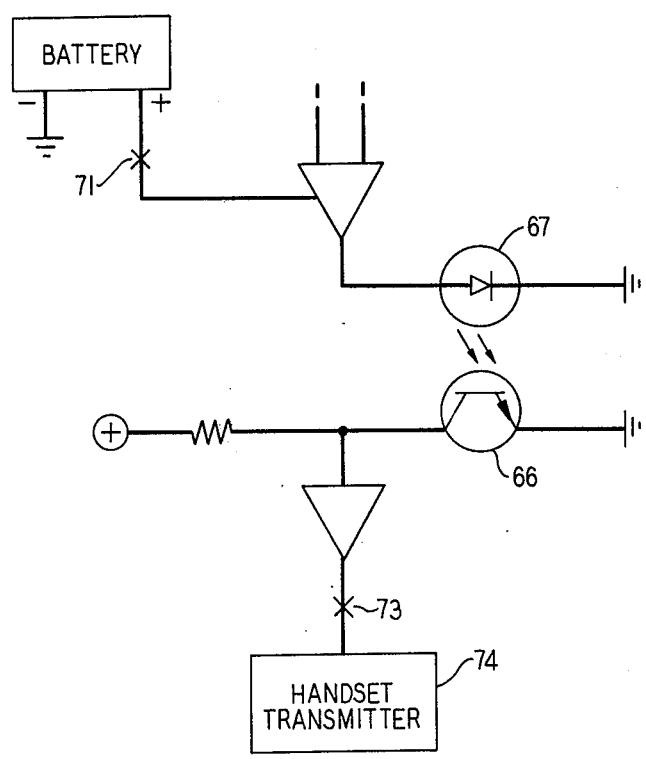
FIG. 8 illustrates the circuit details of an optical output stage of the outpulser employing proximity switches for use with the optically coupled embodiment of FIG. 7.
Figure 7:
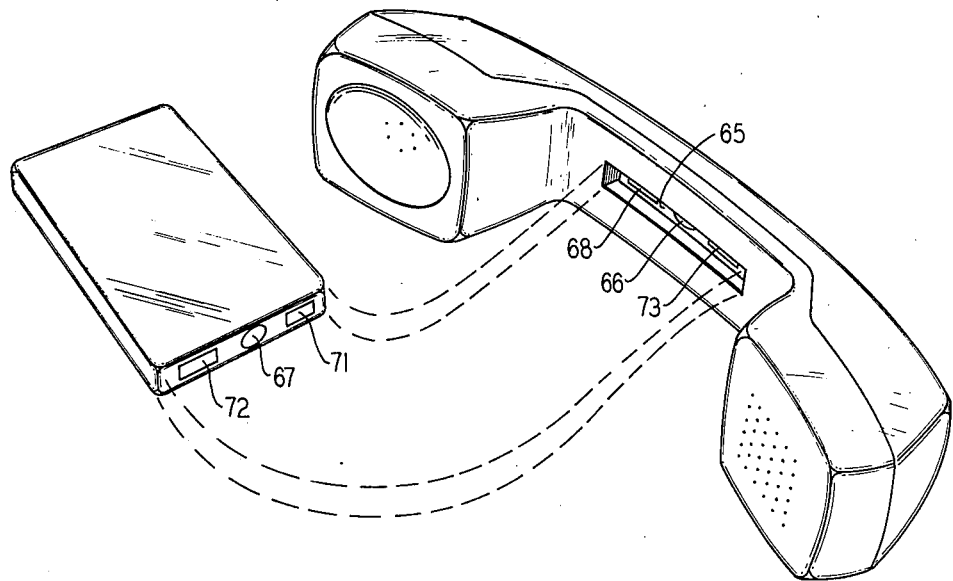
FIG. 7 illustrates an alternative arrangement similar to that of FIG. 6 involving, however, an optical coupling arrangement.

FIG. 7 shows another alternative embodiment of the outpulser utilizing optical coupling of the MF signals to the telephone. A recess 65 is provided in the telephone handset and is similar to recess 64 in FIG. 6, except that recess 65 is provided with a lens and optical receiver 66 for receiving the MF signals. The outpulser card is provided with an optical transmitter 67, which may be a light emitting diode, in optical alignment with the receiver 66 when the card is inserted into recess 65. This embodiment is also provided with proximity switches for activating the receiving circuitry in the telephone handset and the circuitry in the card when the card is inserted into recess 65. Illustrative circuitry associated with the proximity switches is shown in FIG. 8. Specifically, a magnet 68, located on the bottom surface of recess 65 operates a proximity switch 71 mounted on the corresponding surface of the card when it is inserted into the recess. Switch 71, in turn, activates the power to the card as illustratively shown in FIG. 8. A magnet 72 on the card similarly operates a proximity switch 73 located on the bottom surface of recess 65, which completes a connection to the handset transmitter 74 in FIG. 8 from the optical receiver 66 when the card is inserted into recess 65. Other structural features of the embodiment of FIG. 7, such as number select microswitches, etc., are omitted from the drawing for simplicity.

Physical embodiments other than those specifically disclosed are clearly suggested in view of this teaching and fall within the scope of the invention as claimed. For example, a portable outpulser in the form of a ballpoint pen is envisioned. Metallic or optical arrangements may be provided at one end of the pen for coupling to a telephone. A battery source, if needed, and integrated circuitry may be placed in the shaft of the pen in a fashion similar to that disclosed herein. A pushbutton switch, similar to the well known retractor button on conventional pens, may be provided at the other end of the pen and arranged to provide power and to activate outpulsing when depressed.

It is to be understood that the hereinbefore described arrangements are illustrative of the application of principals of our invention. In light of this teaching, it is apparent that numerous other arrangements may be devised by those skilled in the art without departing from the spirit and scope of the invention.

What is claimed is:

1. In an automatic digit outpulser for use in conjunction with a telephone, comprising
   a portable electronic card having electronic circuitry encased within the card,
   a low-profile acoustic device mounted in the card and arranged for accoustically coupling the card to a transmitter of the telephone and, in the electronic circuitry,
   means for storing representations of digits to be outpulsed,
   means for converting the stored representations into audible frequency output signals, and
   means for transmitting the output signals to the acoustic device, the improvement comprising a plurality of first storage words containing the stored digit representations, and a plurality of second storage words containing information for controlling the generation of interdigital timing periods, with ones of the first storage words being arranged in a prescribed sequence with ones of the second storage words.

2. The invention of claim 1 wherein the circuitry further comprises
   oscillator means for producing address signals at prescribed intervals to read the storage words sequentially, and the converting means comprises
   means responsive to the stored representations in one of the first storage words being addressed for generating the audible frequency output signals in accordance therewith during the interval in which said one first storage word is addressed, said converting means being further responsive to the control information in ones of the second storage words for generating interdigital timing intervals while said ones of the second storage words are being addressed.

3. The invention of claim 2 wherein each of the first and second storage words contains a plurality of storage bits, and
   the generating means includes a plurality of tone generators responsive to a first prescribed state of different ones of the storage bits for generating different prescribed output tone signals, whereby in response to a second prescribed state in each of the bit locations of one of the second storage words, the generating means generates no output signal to form an interdigital timing interval.

4. The invention of claim 1 wherein the outpulser further comprises a plurality of switches mounted on the card, which are individually and manually actuatable to preset a starting address of the storing means for selecting one of a plurality of different sequences of digits to be outpulsed.

5. The invention of claim 1 wherein the outpulser further comprises
   means operable for supplying power to the electronic circuitry, and
   means responsive to an operation of the power supplying means for controlling the storing and converting means to generate an alerting signal to the acoustic device.

6. The invention of claim 1 wherein
   the storing means comprises a third storage word containing control data, and
   the circuitry further comprises counter means for addressing the storage words, wherein the counter means includes means responsive to an operation of the power supplying means for presetting the count state of the counter means, thereby to address said third storage word for causing the converting means to generate the alerting signal responsive to the control data.

7. The invention of claim 1 wherein the storing means further comprises means for controlling the converting means to generate an alerting signal to the acoustic device upon the completion of outpulsing of digit signals.

8. A portable automatic digit outpulsing device for use in conjunction with a telephone, comprising electronic circuitry encased within the device,
   means affixed to the device for coupling the electronic circuitry to the telephone,
   said electronic circuitry including
   a memory for alternately storing in sequential memory locations coded representations of digits to be outpulsed to the telephone and first control signals,
   an oscillator for generating address signals to the memory to read sequentially the contents of the memory locations,
   multifrequency signal generating means,
   electronic switch means responsive to the coded representations of digits for controlling the generating means to generate multifrequency signals to the coupling means in accordance with the coded representations of digits,
   wherein said multifrequency signal generating means and said electronic switch means are responsive to the first control signals for generating interdigital intervals.

9. A portable device having electronic circuitry encased therein for use in conjunction with a telephone, said electronic circuitry comprising
   multifrequency generating means controllable for selectively generating in combination or singularly a plurality of single frequency signals,
   storage means having a plurality of storage words each individually addressable and each having a plurality of storage bits each for controlling the generation of a different single frequency signal by the multifrequency generating means, wherein each of a plurality of first words of the storage means has at least two of its storage bits set to a prescribed state defining a multifrequency output signal to be generated representative of a telephone digit, and wherein each of a plurality of second words of the storage means located alternately and sequentially with respect to each of the first words has its respective bit locations set to another prescribed state for controlling the multifrequency generating means to generate no output signal, and oscillator means for generating address signals to read the storage words sequentially at prescribed intervals, and wherein the device comprises means for coupling the output signals from the multifrequency generating means to the telephone.

10. A portable digit outpulser for use with a telephone having a transmitter, comprising a memory containing a plurality of first and second storage words, individual ones of said first storage words being arranged alternately in sequence with individual ones of said second storage words, means for sequentially addressing the storage words, means responsive to information contained in each said first word of the memory for generating a multifrequency output signal representing a telephone digit, and responsive to information contained in each said second word for generating an interdigital timing period, and means for coupling the multifrequency output signals to the telephone.

11. The invention of claim 10 wherein the coupling means comprises an acoustic device mounted on the outpulser and arranged to be placed in proximity with the transmitter to couple acoustically the multifrequency output signals to the transmitter.

12. The invention of claim 10 wherein the telephone comprises optical signal receiving means, and the coupling means comprises optical transmitting means modulated in accordance with the multifrequency output signals, whereby the optical transmitting means is placed in optical alignment with the optical receiving means to couple the multifrequency signals to the telephone.

13. The invention of claim 12 wherein the outpulser further comprises proximity switch means operable to activate the outpulser when the outpulser is in optical coupling alignment with the optical receiving means.

14. The invention of claim 10 wherein the telephone comprises metallic contact receiving means, and the coupling means comprises a plurality of metallic contacts mounted on an external surface of the outpulser and adapted to be engaged with the receiving means on the telephone to couple the multifrequency output signals to the telephone.

15. A portable electronic device for use in conjunction with a telephone station comprising means for coupling signals from the device to the telephone and logic circuitry encased within the device connected to the coupling means, said circuitry including means for storing in alternate storage words first coded data designating audio frequency signals to be generated representative of digits and second control data, means for sequentially addressing the first and second storage words, means responsive to a receipt of the first data from one of the storage words for generating the audio frequency signals designated thereby and for transmitting the signals to the coupling means, and means responsive to a receipt of the second data from one of the storage words for generating a prescribed time interval between individual transmissions of the signals to the coupling means.

16. The invention of claim 15 wherein each of the storage words contains a plurality of first bit locations each for controlling the generation of a different single frequency output signal by said generating means, and a second bit location for controlling the activation of said addressing means, and wherein the storing means comprises in sequence a start word having its first bit locations set to a prescribed state combination for controlling the generating means to generate an alerting signal not representative of a valid telephone digit and its second bit location set to a prescribed state to activate the addressing means, one of the first storage words having its first bit locations set to another prescribed state combination representative of a prescribed telephone digit, and its second bit location set to said prescribed state to activate the addressing means, one of the second words having its first bit locations set to a third prescribed state combination to control the generating means to produce no output signal, and its second bit location set to said prescribed state, followed in alternating sequence by other ones of said first and second storage words, the sequence ending with a stop word having its first bit locations also set to a prescribed state combination for controlling the generating means to generate another alerting signal, and its second bit location set to the opposite of said prescribed state to control the deactivation of said addressing means.

* * * * *